United States Patent [19]
Hindermann

[11] Patent Number: 4,872,546
[45] Date of Patent: Oct. 10, 1989

[54] SCREW CONVEYOR DEVICE

[76] Inventor: Erich A. Hindermann, Sagirain, CH-6403 Küssnacht a.R., Switzerland

[21] Appl. No.: 136,535

[22] Filed: Dec. 22, 1987

Related U.S. Application Data

[63] Continuation of Ser. No. 30,278, Mar. 23, 1987, abandoned, which is a continuation of Ser. No. 729,565, May 2, 1985, abandoned.

[30] Foreign Application Priority Data

Jan. 16, 1985 [DE] Fed. Rep. of Germany ....... 3501259

[51] Int. Cl.4 .............................................. B65G 33/26
[52] U.S. Cl. .................................... 198/659; 198/662; 198/677
[58] Field of Search ............... 198/659, 662, 676, 677, 198/672

[56] References Cited

U.S. PATENT DOCUMENTS

| | | | |
|---|---|---|---|
| 3,707,224 | 12/1972 | Rastoin | 198/659 |
| 3,722,666 | 3/1973 | Ulm et al. | 198/659 |
| 3,726,392 | 4/1973 | Rastoin | 198/659 |

FOREIGN PATENT DOCUMENTS

| | | | |
|---|---|---|---|
| 403984 | 4/1966 | Australia | 198/659 |
| 1543324 | 10/1968 | France | 198/659 |
| 352621 | 4/1961 | Switzerland | 198/659 |
| 615007 | 7/1978 | U.S.S.R. | 198/659 |
| 1135909 | 12/1968 | United Kingdom . | |

Primary Examiner—Joseph E. Valenza
Attorney, Agent, or Firm—Merchant, Gould, Smith, Edell, Welter & Schmidt

[57] ABSTRACT

A screw conveyor device for pourable material has a tubular or hose-like housing which near to one end is provided with an inlet opening and near to the other end with an outlet opening for the conveyed material, also a flexible core which extends through the housing and which is surrounded by at least one drivable feed coil consisting of wire or strip material, and a drive motor connected to one end of the housing. The core is rotatably mounted at both ends of the housing and driven by the drive motor in common with or relative to the feed coil or coils. It is possible for one or two feed coils to be provided.

10 Claims, 3 Drawing Sheets

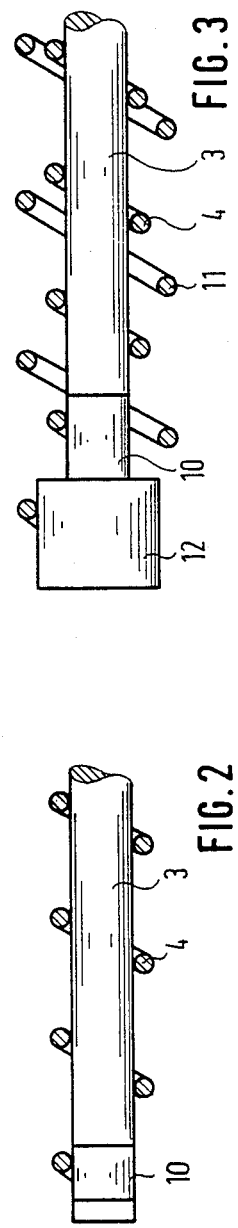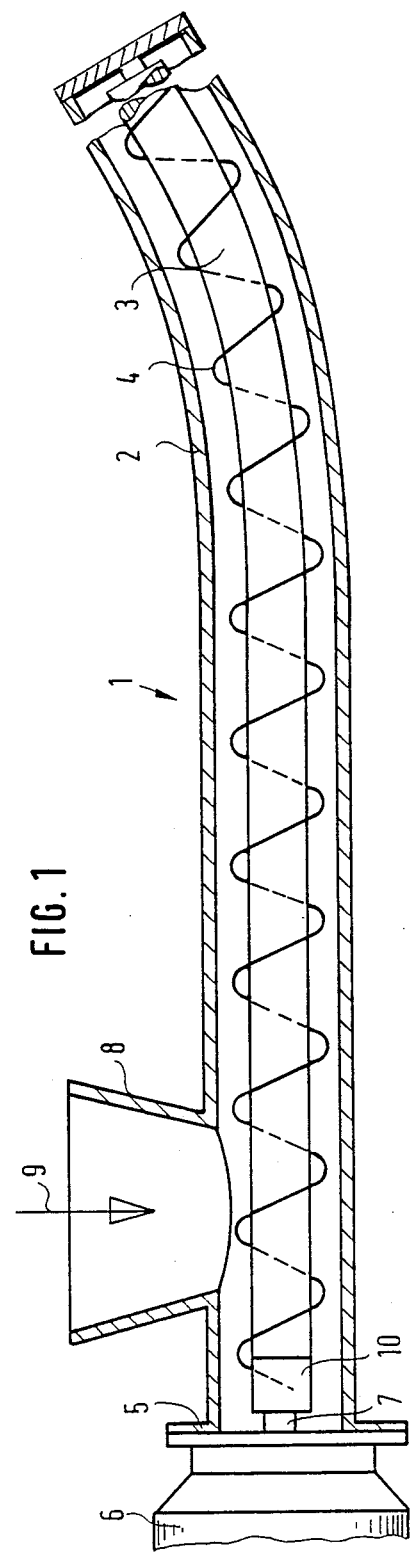

SCREW CONVEYOR DEVICE

This application is a continuation of U.S. application Ser. No. 07/030,278, filed March 23, 1987, now abandoned, which is a continuation of U.S. application Ser. No. 06/729,565, filed May 2, 1985, now abandoned.

FIELD OF THE INVENTION

The invention relates to a screw conveyor device for pourable material, comprising a tubular or hose-like housing which has an inlet opening spaced from an outlet opening, e.g. near opposite ends of the housing, a flexible core extending through the housing, at least one drivable feed coil surrounding the core and suitably consisting of wire or strip material, and a drive motor connected at one end of the housing.

BACKGROUND TO THE INVENTION

In known screw conveyor devices of this type the internal core is arranged stationary in the housing, whereas the feed coil is mounted to be driven to rotate. In operation, excessive stress occurs between the relatively fast rotating feed coil and the stationary coil, causing both wear to the feed coil and core and damage to the conveyed material.

Furthermore, screw conveyor devices are known with one feed coil or even two driven feed coils disposed concentrically to one another, in which the central part is left free i.e. no core is provided. In screw conveyor device of this type there is often the disadvantage, particularly with conveyor device of considerable length and/or with material of high bulk weight being conveyed, that the necessary high torques and axial forces can be transmitted only to a limited extent. The result of this is that frequently in the case of particularly viscous and moist, products, the feed coils untwist or turn off and could break if the admissible strength is exceeded. Another disadvantage of these known screw conveyor devices is that with certain materials which are difficult to convey the speed of rotation has to be relatively high if the flowback of too much material through the central opening of the feed coil is to be avoided. However, particularly with screw conveyor device following a curved path, high speeds of rotation cause the feed coil to oscillate, especially if the conveyor device is insufficiently filled.

Finally, screw conveyor device for pourable material are also known which have a rigid feed screw. Conveyor device of this type have satisfactory conveying characteristics but they are suitable only for more or less horizontal and straight-line conveyance.

OBJECT OF THE INVENTION

The invention is based on the object of obviating the aforementioned disadvantages and of devising a screw conveyor device of the initially mentioned type, with which it is possible to transmit substantial torques without difficulty and which has similar conveying characteristics to a conveyor device with a rigid feed screw.

SUMMARY OF THE INVENTION

According to the invention this object is achieved in that in a screw conveyor device of the initially mentioned type the core is a flexible shaft which is rotatably mounted at both ends of the housing and which is driven by a drive motor in common with or relative to the feed coils.

In other words, according to the invention it is proposed that the pliable or flexible feed coils cooperate with a likewise flexible shaft and are rotatable either together with the core or shaft or else independently thereof, so that relative movements between the feed coil and shaft, and optionally also between the feed coils when two feed coils are provided concentrically one inside the other, are possible. In this case the conveyor device preferably has a flexible tubular or hose-like housing, but, if desired, it may also be provided with a rigid housing. However, in the latter case straight-line conveyance with two small bends would still be possible in one plane.

Preferably, the flexible core is coupled to the drive motor separately from the feed coil or coils.

Optionally, the feed coil or coils are connected at at least one end to the flexible core in a manner precluding relative rotation.

A feed coil may be supported without clearance on the flexible core. Additionally or alternatively at least one feed coil may surround the flexible core with a clearance which may be chosen to be adapted to the grain size of the material to be conveyed.

The conveyor device may further comprise retaining members provided to support at least one feed coil at both ends at least of the flexible core. Further such retaining members may be provided intermediate the ends of the flexible core.

Preferably, the retaining members consist of elastic material.

The feed coil may consist of wire or strip material having circular or rectangular cross section with rounded corners.

Preferably the feed coil or coils are of resilient and corrosion-resistant material.

The feed coils may be of spring steel, high grade steel, bronze, resiliently flexible plastics, glass-fibre reinforced material or carbon-fibre reinforced material.

The flexible core may suitably consist of steel, high grade steel, or resiliently flexible plastics material.

The invention includes a method of conveying material comprising rotating the or each feed coil and the flexible core of a conveyor device as described above at either a common rate or at different rates together with introducing material to be conveyed into the screw conveyor device.

As a result of fixed or independent coupling of the feed coil or coils to the flexible shaft it is possible to transmit much higher torques than with feed coils without a core or with a stationary core. The solid core co-rotating with the feed coils or rotatable independently of these latter makes it possible to achieve similar conveying characteristics to those in known rigid feed screws. The optionally provided relative movement between the feed coil and flexible shaft can be so controlled that no appreciable wear occurs at the feed coils and shaft and, in particular, damage to the conveyed material is obviated.

Therefore, with the screw conveyor device according to invention it is also possible, for example, to convey moist materials without difficulty and without abrasion.

Another advantage of the screw conveyor device according to the invention lies in the flexible shaft having vibration damping properties and the vibration characteristics of the feed coils are substantially improved, particularly when the conveyor device is filled to an inadequate extent.

As a result of the invention a screw conveyor device for pourable material is devised which has similar conveying characteristics to rigid feed screws and is thus also suitable for transmitting high torques so that even materials which pour or run with difficulty, such as damp materials, can be conveyed reliably and without imposing inadmissible stress on the material, which precluding the danger of overloading the conveyor device and thus breaking the feed coils.

BRIEF DESCRIPTION OF THE DRAWINGS

Examples of an embodiment of the screw conveyor device according to the invention are illustrated schematically in the drawings, wherein:

FIG. 1 shows a partial longitudinal section through one embodiment of the screw conveyor device, in which a feed coil is provided without clearance on a flexible shaft.

FIG. 2 shows one end of the flexible shaft of the device according the FIG. 1, from which it is apparent how the single feed coil consisting of wire of a circular cross-section is supported without clearance on the flexible shaft;

FIG. 3 shows a similar view to FIG. 2 but in which two feed coils consisting of wire of circular cross-section are arranged concentrically to one another around the flexible shaft;

DESCRIPTION OF PREFERRED EMBODIMENTS

Figure 6:
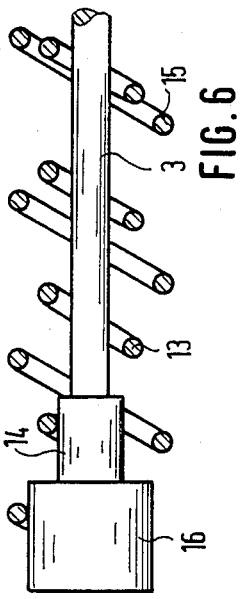
FIG. 6 shows a view as in FIG. 5 but in which two feed coils consisting of wire of circular cross-section are arranged concentrically and each with clearance on the flexible shaft.

A screw conveyor device 1 illustrated in FIG. 1 contains in a hose-like pliable or flexible housing 2 A flexible shaft 3 on which a feed coil 4 consisting of wire material is supported without clearance. The wire material of the feed coil 4 may be of circular or rectangular cross-section with rounded corners, i.e. the feed coil 4 may consist both of wire material and of strip material. The feed coil here consists of resilient and corrosion-resistant material, preferably of spring steel, high-grade steel, bronze, resiliently flexible plastics, or glass or carbon-fibre reinforced material. The flexible shaft 3 preferably consists of steel, high-grade steel or resiliently flexible plastics material.

At the front end 5 of the housing 2 visible in FIG. 1 there is flanged-mounted a drive motor 6, the output shaft 7 of which is connected to the flexible shaft 3. Depending on the direction of rotation of the drive motor 6, the flexible shaft 3 with feed coil 4 mounted thereon has either a drawing or ramming action so that the material to be conveyed is either drawn through or pushed through the housing 2.

Near to the end face 5 a hopper 8 discharging into the housing 2 is mounted thereon, which hopper, as indicated by arrow 9, can be used as a feed hopper. In this case, the shaft 3 is caused to rotate by the drive motor 6 in such a way that the material to be conveyed is pushed through the housing 2 by ram action. With a corresponding different arrangement of the hopper 8 it could also be used as an outlet opening. In this case, the shaft 3 would have to be driven in the opposite direction of rotation so that the material to be conveyed would be drawn through the housing 2.

FIG. 2 shows that an end piece 10 of the shaft 3 of the feed coil 4 is connected to the latter so as to rotate therewith but is supported practically without clearance along the entire length of the shaft 3, so that relative movements are only possible to the extent necessitated by bending. Any oscillation of the feed coil 4 relative to the flexible shaft 3 is thereby reliably prevented.

FIG. 3 shows that a further feed coil 11 is disposed concentrically around the shaft 3 together with the feed coil 4 mounted on the latter without clearance. This outer feed coil 11 is secured to an additional end piece 12 of the flexible shaft 3 having enlarged diameter. Another end piece of this type is provided at the opposite end of the flexible shaft 3. Moreover, it is possible for annular or like spacers for the outer feed coil 11 to be mounted on the flexible shaft 3 between the ends thereof so as to eliminate to a large extent any oscillation of the outer feed coil relative to the flexible shaft 3.

Figure 5:
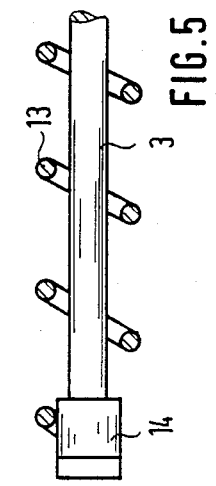
FIG. 5 shows a view of the end of the flexible shaft of the conveyor device in FIG. 4, from which it is apparent how the feed coil is mounted with clearance on the flexible shaft.
Figure 4:
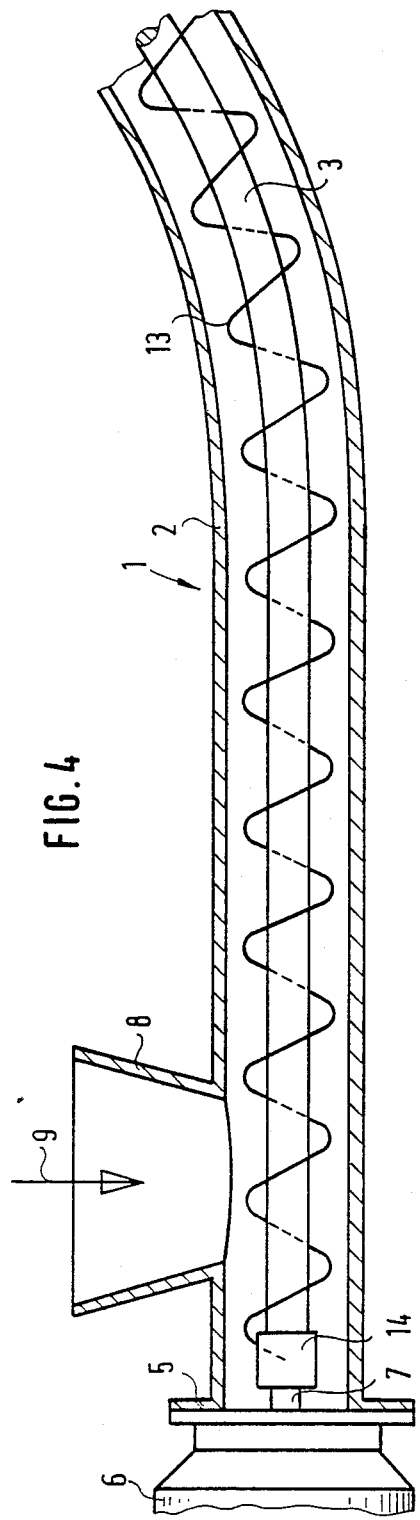
FIG. 4 shows a partial longitudinal section through a screw conveyor device similar to that in FIG. 1 but in which a feed coil is arranged on the flexible shaft with clearance or radial spacing.
Figure 8:
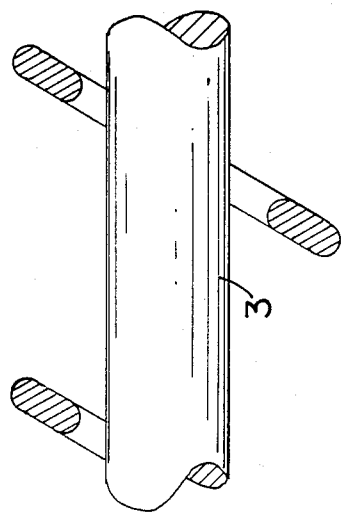
FIG. 8 shows a partial view of the coil having a rectangular cross section.

In the screw conveyor device 1 illustrated in FIG. 4 there is provided a feed coil 13 which surrounds the flexible shaft 3 with radial clearance, as shown particular in FIG. 5. The flexible shaft 3 is thus provided at either end with an end piece 14 of larger outer diameter, to which the ends of the feed coil 13 are secured. Otherwise, the conveyor device in FIG. 4 functions in the same way as the conveyor device in FIG. 1.

FIG. 6 shows that a further feed coil 15 is arranged concentrically around the feed coil 13 and is of such diameter that it fits over the feed coil 13. In this embodiment, the flexible shaft 3 is provided at its ends with and additionally, further widened end piece 16 to which the ends of the outer feed coil 15 are secured.

The end pieces 10, 12, 14 and 16 may be connected to the corresponding flexible shaft 3 so as to be fixed to rotate therewith but they may also be mounted to rotate relative thereto. In this latter embodiment, the feed coils can rotate relative to the flexible shaft 3, which may be especially advantageous if the feed coils 11, 13 and 15 are arranged around the flexible shaft 3 with radial clearance.

Figure 7:
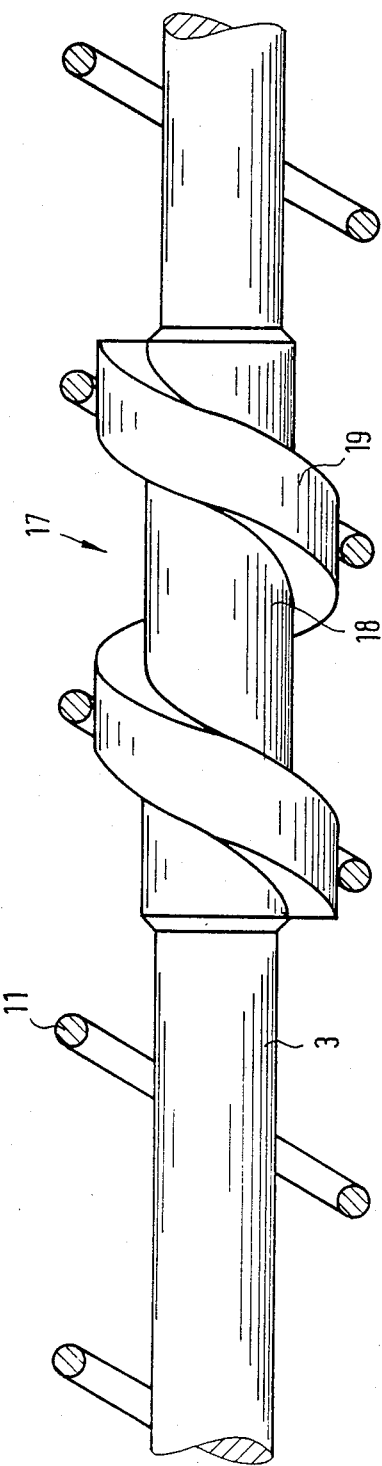
FIG. 7 shows, on an enlarged scale, a partial view of a flexible shaft which between its ends carries a spacing member on which a feed coil is supported surrounding the flexible shaft substantially with clearance between the ends thereof.

FIG. 7 shows that between its ends the flexible shaft 3 may be provided with at least one spacer 17 which serves as a support, for example for the outer feed coil 11 of the embodiment according to FIG. 3, so as also to support the outer feed coil 11 between its ends on the shaft 3. In the embodiment according to FIG. 7, the spacer 17 comprises a cylindrical base member 18 of enlarged diameter and a helical web 19 mounted thereon, on which which the feed coil 11 is supported by two turns. The spacer 17 and in particular its web 19 consists of elastic material so that as a result of frictional contact a connection precluding relative rotation is formed between the feed coil 11 and the spacer 17 or the flexible shaft 3.

The cylindrical base member 18 serves as a support for the inner feed coil 13 (not shown here) also surrounding the flexible shaft with radial clearance. If the feed coil 4 is supported on the flexible shaft 3 without clearance, it is possible to omit entirely the sleeve-like cylindrical base member 18 mounted on the flexible shaft 3, so that the helical web 19 is seated directly on the shaft 3.

The radial spacing between the flexible shaft 3 and the feed coils 11, 13 and 15 surrounding the latter with radial clearance, and also the radial spacing between the feed coils disposed concentrically to one another around the flexible shaft 3, is preferably adjusted to the grain size of the material to be conveyed, so as to prevent the material from being subjected to excessive stress and thus from being damaged.

For the connection precluding relative rotation between the drive motor and the feed coil or coils and/or the flexible shaft or shafts there is provided a coupling (not shown), for example a square, a hexagon or a splined hub.

I claim:

1. A screw conveyor device for pourable material comprising a tubular housing which has an inlet opening for material to be conveyed and has an outlet opening for conveyed material spaced from said inlet, a rotatable flexible central shaft extending through the housing, at least one drivable feed coil surrounding the rotatable shaft, a retaining member, consisting of an elastic material, supporting said at least one feed coil at both ends of the flexible core, means rotatable mounting the shaft at both ends of the housing, and a drive motor at one end of the housing connected to drive the shaft and said at least one feed coil to rotate; wherein said at least one feed coil is connected at at least one end to the flexible shaft in a manner precluding relative rotation and wherein said at least one feed coil is supported without clearance on the flexible shaft.

2. A screw conveyor device as claimed in claim 1, where said at least one feed coil is a wire material.

3. A screw conveyor device as claimed in claim 1, further comprising a second feed coil which surrounds the flexible shaft with a clearance adapted to the grain size of the material to be conveyed.

4. A screw conveyor device as claimed in claim 1, wherein at least one feed coil is of wire material having a circular cross-section.

5. A screw conveyor device as claimed in claim 1, wherein the at least one feed coil is of strip material having a rounded-cornered, rectangular cross-section.

6. A screw conveyor device as claimed in claim 1, wherein the at least one feed coil is of resilient and corrosion-resistant material.

7. A screw conveyor device as claimed in claim 6, wherein the at least one feed coil is a spring steel material.

8. A screw conveyor device as claimed in claims 1, wherein the flexible core is a resiliently flexible plastics material.

9. A method for conveying a material comprising introducing the material into a screw conveyor device comprising a tubular housing which has an inlet opening for material to be conveyed and has an outlet opening for conveyed material spaced from said inlet, a flexible shaft extending through the housing, at least on derivable feed coil surrounding the shaft, a retaining member, consisting of an elastic material, supporting said at least one feed coil at both ends of the flexible core, means rotatably mounting the shaft at both ends of the housing, and a drive motor at one end of the housing connected to drive the shaft and said at least one feed coil to rotate, wherein said at least one feed coil is connected at at least one end to the flexible shaft in a manner precluding relative rotation and wherein said at least one feed coil is supported without clearance on the flexible shaft and rotating the at least one feed coil and the flexible core at a common rate.

10. The screw conveyor of claim 3, further comprising an elastic spacer positioned between said second coil and said shaft.

* * * * *